July 13, 1943.   F. M. ARCHIBALD   2,324,054
PROCESS OF RECOVERING ETHERS
Filed Dec. 19, 1939
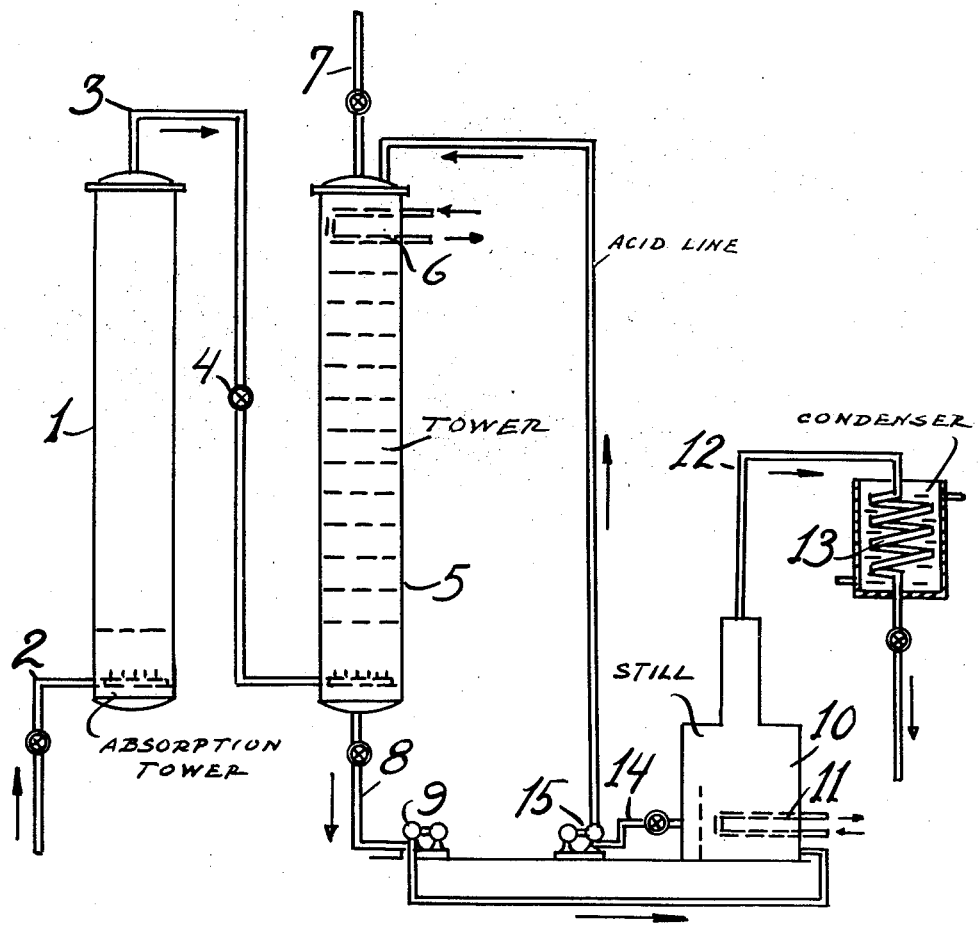
Francis M. Archibald Inventor
By A. H. Young Attorney Patented July 13, 1943

2,324,054

UNITED STATES PATENT OFFICE 2,324,054

PROCESS OF RECOVERING ETHERS

Francis M. Archibald, Elizabeth, N. J., assignor to Standard Alcohol Company

Application December 19, 1939, Serial No. 310,087

4 Claims. (Cl. 260—616)

This invention relates to an improvement in the process involving the hydration of olefin.

It is old to pass olefins, mixtures of olefins and mixtures of olefins with saturated hydrocarbons through a hydrating catalyst such as sulfuric acid of proper concentration to obtain either a reactive acid liquor or the hydration products direct. In the case of reactive acid liquor, the final predominant product obtained is determined by the conditions under which the acid liquor is diluted and distilled. In any event, during the formation of the acid liquor, some ether is formed which is carried over from the reaction chamber by the unreacted gases. The amount of ether in the unreacted gases leaving the absorption chamber varies between ½ and 10%, according to the conditions of temperature and pressure prevalent in the absorption chamber. To permit the ether to remain in the overhead gases from the absorption tower is distinctly not advantageous. If the gases are pure olefins and are to be recycled to the absorption tower, the ether present in the gases will react with the hydrating medium in preference to the olefin, thus reducing the absorbing efficiency of the absorption tower. If the gases are pure olefins but of a nature such that they are to be used in a subsequent reaction for the production of a compound differing from that produced in the first absorber, then the ether present in the gases will react in the subsequent treatment of the gases and prevent the formation of a pure or substantially pure product. On the other hand, if the gases leaving the absorber are saturated hydrocarbons and are to be used merely as a fuel or for some similar purpose, the ethers present therein would be lost unless some steps were taken for their recovery. In the case where the hydrating medium is maintained under conditions such that the products of hydration are formed direct, they are removed from the reaction chamber in vaporous form along with the unreacted gases. The hydration products are removed from the unreacted gases by condensation, but a certain amount of ether will still be found in the unreacted gases.

Heretofore attempts to recover ether from spent gases have been confined to methods utilizing condensation. Such methods have not proved satisfactory as, for example, 114 liters of a mixture of propane gas and isopropyl ether at 69° F. in which the concentration of isopropyl ether was 2.75% was passed through a condenser maintained at a temperature of 32° F. and 7.118 grams of ether was collected as a condensate. This is a recovery of 49.4% of the available ether in the gas. It is obvious that to maintain a temperature of 32° F. in the condenser on a plant scale is economically unfeasible and that higher temperatures would condense less of the ether.

It has now been found that spent gases containing vaporous ether can have the ether removed therefrom by bubbling the mixture through concentrated phosphoric acid maintained at atmospheric temperature or below and that the ether can be recovered from the phosphoric acid by heating the acid to the boiling point of the ether with subsequent condensation of the ether.

The present invention, together with various objects and advantages thereof, may best be understood from the accompanying drawing and a description of the mode of operation depicted thereby.

In the drawing, the figures give a diagrammatic view of the apparatus.

Numeral 1 represents an absorption tower charged with sulfuric acid into which an olefin, mixture of olefins, or mixture of olefin and saturated hydrocarbon, is passed by pipe 2; unreacted gases and entrained ether leave the absorption tower through pipe 3 and are released through valve 4 into plate tower 5. Tower 5 is a conventional plate or packed tower charged with concentrated phosphoric acid equipped with a cooling coil 6 for maintaining the temperature within the tower at at least atmospheric temperature. The gases are exhausted through pipe 7. Phosphoric acid and adsorbed ether are removed from tower 5 through pipe 8 and pumped by pump 9 into still 10. The acid in still 10 is heated to the boiling point of the absorbed ether by heating coil 11. The vaporized ether is removed through pipe 12 and conveyed to condenser 13. After removal of the ether, the phosphoric acid is pumped by pump 15 from still 10 through pipe 14 to the top of tower 5.

Obvious modifications to the above described apparatus will occur to anyone skilled in the art upon reading the foregoing description.

The following is a specific example of the recovery of ether to be effected by the use of phosphoric acid:

*Example 1*

100 liters of mixed propane gas and isopropyl ether containing 12.6 grams of ether was passed at the rate of 1.1 liters per minute through a plate tower charged with concentrated phosphoric acid and maintained at a temperature of 69° F. The phosphoric acid was removed from the tower and heated to 68° C. to drive off the isopropyl ether which was recovered by condensation. 12.3 grams of condensed ether were recovered which is 97.5% of the ether in the original gas.

The foregoing description is made for the purpose of illustration only and is not to be construed as in any way limiting the invention:

What I claim is:

1. The process comprising passing a gaseous mixture of spent hydrocarbon and ether into a concentrated phosphoric acid, removing the spent hydrocarbon and recovering the ether from the concentrated acid by heating.

2. A process comprising passing a gaseous mixture of olefin and an ether into concentrated phosphoric acid to absorb the ether, removing the unabsorbed olefin and recovering the ether from the concentrated acid by heating.

3. A process comprising passing a gaseous mixture of propylene and isopropyl ether into concentrated phosphoric acid to absorb the ether, removing the propylene and heating the concentrated acid to recover the ether.

4. A process comprising passing a gaseous mixture of propylene and isopropyl ether into concentrated phosphoric acid to absorb the ether, removing the propylene, heating the concentrated acid to 68° C. to vaporize the ether and recovering the vaporized ether by condensation.

FRANCIS M. ARCHIBALD.